(12) United States Patent
Ireland et al.

(10) Patent No.: US 12,450,836 B2
(45) Date of Patent: Oct. 21, 2025

(54) DETERIORATED VIDEO FEED

(71) Applicant: CAE Inc., Saint-Laurent (CA)

(72) Inventors: Alexander Ireland, Montréal (CA); Jack Russ, Montréal (CA); David Bowness, Montréal (CA)

(73) Assignee: CAE Inc., Saint-Laurent (CA)

( * ) Notice: Subject to any disclaimer, the term of this patent is extended or adjusted under 35 U.S.C. 154(b) by 239 days.

(21) Appl. No.: 17/673,593

(22) Filed: Feb. 16, 2022

(65) Prior Publication Data

US 2022/0254115 A1    Aug. 11, 2022

Related U.S. Application Data

(63) Continuation of application No. 15/476,949, filed on Mar. 31, 2017, now abandoned.

(51) Int. Cl.
*G06T 19/00*    (2011.01)
*G06T 5/50*    (2006.01)
(Continued)

(52) U.S. Cl.
CPC .............. *G06T 19/006* (2013.01); *G06T 5/50* (2013.01); *G06T 7/10* (2017.01); *G06T 7/97* (2017.01);
(Continued)

(58) Field of Classification Search
CPC ............ G06T 19/006; G06T 7/10; G09B 5/06
See application file for complete search history.

(56) References Cited

U.S. PATENT DOCUMENTS 8,106,924 B2    1/2012    Aliprandi et al.
8,217,995 B2    7/2012    Dobbins et al.
(Continued)

FOREIGN PATENT DOCUMENTS

EP    0537945 A1    4/1993

OTHER PUBLICATIONS

Ates, H.C.; Fiannaca, A.; and Folmer, E., "Immersive Simulation of Visual Impairments Using a Wearable See-through Display", In Proceedings of the Ninth International Conference on Tangible, Embedded, and Embodied Interaction, pp. 225-228, Jan. 15-19, 2015 (Jan. 19, 2015).

(Continued)

*Primary Examiner* — Yi Yang
(74) *Attorney, Agent, or Firm* — Gowling WLG (Canada) LLP

(57) ABSTRACT

A method and apparatus for creating a deteriorated video feed from actions of a user. The apparatus receives a video feed from one or more cameras, within an enclosed area comprising one or more tangible instruments of a system on which the user performs the actions, wherein the video feed provides images related to the actions performed by the user interacting with the system through the one or more tangible instruments. The apparatus captures one or more visual-perception inhibitors affecting the user, wherein the one or more visual-perception inhibitors affect the user while performing the actions in the system. The apparatus comprises a video processing module for deteriorating the video feed by selectively modifying images from the video feed into a deteriorated video feed considering the captured one or more visual-perception inhibitors.

20 Claims, 6 Drawing Sheets

(51) Int. Cl.
- *G06T 7/00* (2017.01)
- *G06T 7/10* (2017.01)
- *G06T 15/20* (2011.01)
- *G06V 20/52* (2022.01)
- *G06V 40/10* (2022.01)
- *H04N 7/18* (2006.01)

(52) U.S. Cl.
CPC ............ *G06T 15/205* (2013.01); *G06V 20/52* (2022.01); *G06V 40/107* (2022.01); *H04N 7/181* (2013.01); *G06T 2207/10016* (2013.01)

(56) References Cited

U.S. PATENT DOCUMENTS

| | | |
|---|---|---|
| 9,058,054 B2 | 6/2015 | Wheeler et al. |
| 2005/0174535 A1 | 8/2005 | Lai et al. |
| 2009/0271552 A1 | 10/2009 | Pyk |
| 2009/0278917 A1 | 11/2009 | Dobbins et al. |
| 2012/0280988 A1 | 11/2012 | Lampotang et al. |
| 2013/0302760 A1 | 11/2013 | Welles et al. |
| 2014/0186810 A1 | 7/2014 | Falash et al. |
| 2014/0268356 A1 | 9/2014 | Bolas et al. |
| 2015/0040059 A1 | 2/2015 | Yuan |
| 2015/0091780 A1 | 4/2015 | Lyren |
| 2015/0205135 A1 | 7/2015 | Border |
| 2016/0026253 A1* | 1/2016 | Bradski ................ H04N 13/128 345/8 |
| 2016/0373682 A1* | 12/2016 | DeAngelis ................ F41J 5/14 |
| 2018/0118219 A1 | 5/2018 | Hiei et al. |
| 2018/0121767 A1 | 5/2018 | Wang et al. |

OTHER PUBLICATIONS

Extended European Search Report dated Jan. 15, 2021 for corresponding EP application No. 18776031.9.

* cited by examiner

2000

```
┌─────────────────────────────────────────────┐
│ in an enclosed area, providing one or more   │
│ tangible instruments of a system on which    │
│ the user performs the actions 2010           │
└─────────────────────────────────────────────┘
                      ↓
┌─────────────────────────────────────────────┐
│ receiving a video feed, through a video      │
│ input port, from one or more cameras,        │
│ within the enclosed area, providing images   │
│ related to the actions performed by the user │
│ interacting with the system through the one  │
│ or more tangible instruments 2020            │
└─────────────────────────────────────────────┘
                      ↓
┌─────────────────────────────────────────────┐
│ capturing one or more visual-perception      │
│ inhibitors affecting the user, wherein the   │
│ one or more visual-perception inhibitors     │
│ affect the user while performing the actions │
│ in the system 2030                           │
└─────────────────────────────────────────────┘
                      ↓
┌─────────────────────────────────────────────┐
│ at a video processing module, deteriorating  │
│ the video feed by selectively modifying      │
│ images from the video feed into a            │
│ deteriorated video feed considering the      │
│ captured one or more visual-perception       │
│ inhibitors 2040                              │
└─────────────────────────────────────────────┘
```

```
defining a field view of a user from a 3D location within an
enclosed area 5010
```

```
receiving, through a network from a first data source, the
sequence of events related to the system, the sequence of
events comprising actions of the user performed on one or
more tangible instruments of the system for interacting
with the system 5020
```

```
receiving, through the network from a second data source,
images related to the one or more tangible instruments
within the field of view of the user and related to at least a
portion of the enclosed room within the field of view of the
user 5030
```

```
determining a virtual camera position in the enclosed area
from the 3D location 5040
```

```
rendering the stream of images from the virtual camera
position considering the received sequence of events and
the received images 5050
```

Figure 5

DETERIORATED VIDEO FEED

TECHNICAL FIELD

The present invention relates to a video processing device and, more particularly, to a video processing device for processing a video feed of a user in a simulator or other system.

BACKGROUND

Interactive computer simulation systems are used to train personnel on complex and/or risky tasks. The interactive computer simulation allows a user to train in a computer generated environment by controlling a simulated element (e.g., an aircraft, a ground vehicle, a space station, operating room, etc.). There is a need for a real-time video feed of the user performing actions within the interactive computer simulation to enable an instructor to observe the user. There is further a need to store such a video feed to enable the user to review his or her performance in the interactive computer simulation. There is a similar need in actual systems, such as actual aircrafts, ground vehicles, spaces stations, and operating rooms, to capture, process, and store such a video feed to enable the user to review his or her performance.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of a first embodiment of the invention is directed to a video processing apparatus for creating a deteriorated video feed from actions of a user. The video processing apparatus comprises a video input port for receiving a video feed from one or more cameras, within an enclosed area comprising one or more tangible instruments of a system on which the user performs the actions, wherein the video feed provides images related to the actions performed by the user interacting with the system through the one or more tangible instruments. The video processing apparatus further comprises an input module for capturing one or more visual-perception inhibitors affecting the user, wherein the one or more visual-perception inhibitors affect the user while performing the actions in the system. The video processing apparatus further comprises a video processing module for deteriorating the video feed by selectively modifying images from the video feed into a deteriorated video feed considering the captured one or more visual-perception inhibitors.

Optionally, the video processing apparatus may comprise a display module for displaying the deteriorated video feed.

Optionally, the video processing apparatus may comprise a storage module for storing the deteriorated video feed.

Optionally, at least one of the one or more visual-perception inhibitors may be dizziness of the user or a partial blackout of the user. Optionally, at least one of the one or more visual-perception inhibitors may be a higher than normal g-force on the user. Optionally, at least one of the one or more visual-perception inhibitors may be fatigue, workload, or stress. Optionally, at least one of the one or more visual-perception inhibitors may be tunnel vision. Optionally, at least one of the one or more visual-perception inhibitors may be a restricted field of view as a result of the user wearing glasses or contact lenses. Optionally, at least one of the one or more visual-perception inhibitors may be a restricted field of view or blurriness as a result of a prior eye defect or age.

Optionally, the one or more cameras may have a video-feed angle of view and wherein deteriorating the video feed comprises cropping the images considering an effective visual field of the user, the effective visual field being within the video-feed angle of view, wherein the effective visual field of the user is a possible field of view of the user or an actual field of view of the user. Optionally, the video processing apparatus may further comprise a tangible or virtual toggle switch for switching the effective visual field of the user between the possible visual field of the user and the actual visual field of the user.

Optionally, deteriorating the video feed may comprise making the images or parts of the images blurry. Optionally, deteriorating the video feed may comprise making text within the images blurry. Optionally, deteriorating the video feed may comprise making the images shake. Optionally, deteriorating the video feed may comprise increasing or decreasing the contrast of the images.

Optionally, at least one of the one or more visual-perception inhibitors may automatically be measured from the user using a measurement device that is connected to the video processing apparatus through the input module. Optionally, the measurement device measures an eye-level of the user. Optionally, deteriorating the video feed may comprise rotating the video feed in response to changes in the eye-level of the user.

Optionally, at least one of the one or more visual-perception inhibitors may be manually entered.

Optionally, the video input port may be for receiving the video feed through a network as data. Optionally, the video input port may be for receiving the video feed over a video cable.

Optionally, the system may be a simulator. Optionally, the system may be a flight simulator. Optionally, the enclosed area may be an enclosed room comprising a cockpit of the flight simulator.

Optionally, the system may be a hospital operating room simulator. Optionally, the system may be a paramedic vehicle simulator. Optionally, the system may be a paramedic-related scene simulator.

Optionally, the system may be an aircraft.

Optionally, the system may be a hospital operating room. Optionally, the system may be a paramedic vehicle. Optionally, the system may be a paramedic-related scene.

Optionally, at least one of the one or more cameras may be located on a body part of the user. Optionally, at least one of the one or more cameras is located on a head of the user.

Optionally, the input module may further be for automatically capturing movements of the user and moving at least one of the one or more cameras in response to such movements.

A second aspect of the first embodiment of the invention is directed to a method for creating a deteriorated video feed from actions of a user. The method comprises in an enclosed area, providing one or more tangible instruments of a system on which the user performs the actions. The method further comprises receiving a video feed, through a video input port, from one or more cameras, within the enclosed area, providing images related to the actions performed by the user interacting with the system through the one or more tangible instruments. The method also comprises capturing one or more visual-perception inhibitors affecting the user, wherein the one or more visual-perception inhibitors affect the user while performing the actions in the system. The method comprises at a video processing module, deteriorating the video feed by selectively modifying images from the video feed into a deteriorated video feed considering the captured one or more visual-perception inhibitors.

Optionally, the method may further comprise displaying the deteriorated video feed on a display module.

Optionally, the one or more cameras may have a video-feed angle of view and wherein deteriorating the video feed may comprise cropping the images considering an effective visual field of the user, the effective visual field being within the video-feed angle of view, wherein the effective visual field of the user is a possible field of view of the user or an actual field of view of the user. Optionally, the method may further comprise switching the effective visual field of the user between the possible visual field of the user and the actual visual field of the user.

Optionally, at least one of the one or more visual-perception inhibitors may automatically be measured from the user using a measurement device.

Optionally, the video input port may be for receiving the video feed through a network as data. Optionally, the video input port may be for receiving the video feed over a video cable.

Optionally, the system may be a flight simulator.

Optionally, at least one of the one or more cameras may be located on a head of the user.

Optionally, the method may further comprise capturing movements of the user and moving at least one of the one or more cameras in response to such movements.

A first aspect of a second embodiment of the invention is directed to a video generation apparatus for generating a stream of images representing a sequence of events related to a system. The video generation apparatus comprises a processor module for defining a field view of a user from a 3D location within an enclosed area. The video generation apparatus further comprises a network interface module for receiving, from a first data source, the sequence of events related to the system, the sequence of events comprising actions of the user performed on one or more tangible instruments of the system for interacting with the system. The network interface module is further for receiving, from a second data source, images related to the one or more tangible instruments within the field of view of the user and related to at least a portion of the enclosed area within the field of view of the user. The video generation apparatus further comprises an image generator module for determining a virtual camera position in the enclosed area from the 3D location, and rendering the stream of images from the virtual camera position to produce a rendered stream of images considering the received sequence of events and the received images.

Optionally, the images may be previously rendered and rendering the stream of images may comprise applying at least one mask to the images.

Optionally, the network interface module may further be for receiving a 3D wire frame model related to the one or more tangible instruments within the field of view of the user and related to at least a portion of the enclosed area within the field of view of the user. Optionally, the images may be textures and rendering the stream of images may comprise applying the textures to the 3D wire frame model.

Optionally, the video generation apparatus may comprise a display module for displaying the rendered stream of images.

Optionally, the video generation apparatus may comprise a storage module for storing the rendered stream of images.

Optionally, the 3D location may be a fixed location within the enclosed area.

Optionally, the network interface module may further be for receiving changes in the 3D location from a motion tracker in the system, and wherein the virtual camera position changes in response to changes in the 3D location.

Optionally, the network interface module may further be for receiving an eye-level of the user, and rendering the stream of images comprises rotating the stream of images in response to changes in the eye-level of the user.

Optionally, the system may be a simulator. Optionally, the system may be a flight simulator. Optionally, the enclosed area may be an enclosed room comprising a cockpit of the flight simulator.

Optionally, the system may be a hospital operating room simulator. Optionally, the system may be a paramedic vehicle simulator. Optionally, the system may be a paramedic-related scene simulator.

Optionally, the system may be an aircraft.

Optionally, the system may be a hospital operating room. Optionally, the system may be a paramedic vehicle. Optionally, the system may be a paramedic-related scene.

Optionally, the video generation apparatus may further comprise an input module for capturing one or more visual-perception inhibitors affecting the user, wherein the one or more visual-perception inhibitors affect the user while performing the actions in the system. Optionally, rendering the stream of images may comprise selectively modifying the stream of images considering the captured one or more visual-perception inhibitors.

A second aspect of the second embodiment of the invention is directed to a method for generating a stream of images representing a sequence of events related to a system. The method comprises defining a field view of a user from a 3D location within an enclosed area. The method further comprises receiving, through a network from a first data source, the sequence of events related to the system, the sequence of events comprising actions of the user performed on one or more tangible instruments of the system for interacting with the system. The method also comprises receiving, through the network from a second data source, images related to the one or more tangible instruments within the field of view of the user and related to at least a portion of the enclosed area within the field of view of the user. The method comprises determining a virtual camera position in the enclosed area from the 3D location, and rendering the stream of images from the virtual camera position considering the received sequence of events and the received images.

Optionally, the images may be previously rendered and rendering the stream of images may comprise applying at least one mask to the images.

Optionally, the method may further comprise receiving through the network a 3D wire frame model related to the one or more tangible instruments within the field of view of the user and related to at least a portion of the enclosed area within the field of view of the user. Optionally, the images may be textures and rendering the stream of images may comprise applying the textures to the 3D wire frame model.

Optionally, the method may further comprise displaying the stream of images on a display module.

Optionally, the 3D location may be a fixed location within the enclosed area.

Optionally, the method may further comprise receiving changes in the 3D location from a motion tracker in the system, and wherein the virtual camera position may change in response to changes in the 3D location.

Optionally, the method may further comprise receiving an eye-level of the user, and rendering the stream of images may comprise rotating the stream of images in response to changes in the eye-level of the user.

Optionally, the system may be a flight simulator.

Optionally, the method may further comprise capturing one or more visual-perception inhibitors affecting the user, wherein the one or more visual-perception inhibitors affect the user while performing the actions in the system. Optionally, rendering the stream of images may comprise selectively modifying the stream of images considering the captured one or more visual-perception inhibitors.

BRIEF DESCRIPTION OF THE DRAWINGS

Further features and exemplary advantages of the present invention will become apparent from the following detailed description, taken in conjunction with the appended drawings, in which:

FIG. 2 is a flow chart of an exemplary method for processing a video feed of a user performing actions within a simulator or other system, in accordance with the teachings of the present invention;

FIG. 5 is a flow chart of an exemplary method for rendering a stream of images, in accordance with the teachings of the present invention.

DETAILED DESCRIPTION

Figure 1:
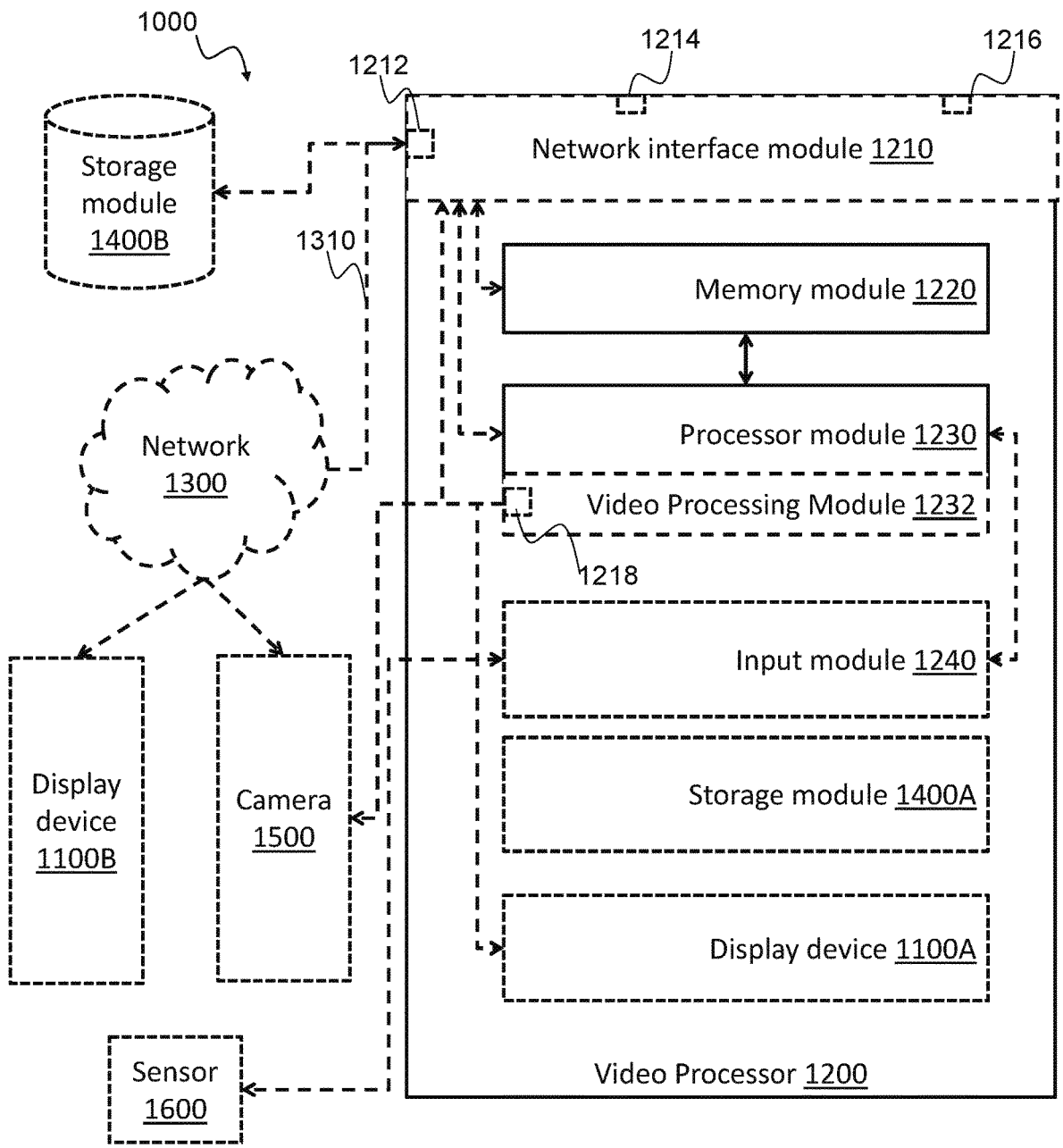
FIG. 1 is a logical modular representation of an exemplary system comprising a video processor for processing a video feed of a user performing actions within a simulator or other system, in accordance with the teachings of the present invention.

Reference is now made to the drawings in which FIG. 1 shows a logical modular view of an exemplary video processing system 1000 in accordance with the teachings of a first embodiment of the present invention. The video processing system 1000 comprises one or more cameras within an interactive computer simulator providing an enclosed area, such as an enclosed room comprising a cockpit in the case of a flight simulator. One or more of the cameras may be located on the body, and in particular on the head, of a user of the interactive computer simulator. One or more of the cameras may also be located above and behind the user, or at different locations throughout the enclosed area. The video feed captured by the one or more cameras comprise the field of view of the user. That is, at least one of the one or more cameras is pointed in the same direction as the point of view of the user and the angle of view of said at least one camera is at least as wide as the field of view of the user. The one or more cameras may move to track the field of view of the user in response to movements of the user's head or eyes. The interactive computer simulator provides a virtual environment and various tangible instruments (or controls) within the enclosed area to allow enactment of different scenarios for the purpose of training one or more users. The one or more cameras produce a video feed of the user interacting with the interactive computer simulator through the various tangible instruments.

The video processing system 1000 further comprises a video processor 1200. The video processor 1200 might receive the video feed from the one or more cameras via a video input port. Alternatively, the video processor 1200 might receive the video feed from the one or more cameras via a network 1300. The video processor 1200 further receives one or more visual-perception inhibitors that negatively affects the vision of the user while the user uses the interactive computer simulator. For example, the user may have a prior eye defect that limits his or her peripheral vision, restricts his or her field of view, or otherwise creates blurriness. The user's 3200 peripheral vision may be blurry because he or she wears glasses or contact lenses. As a further alternative, the user's vision may be affected by the fact that he or she wears glasses with bifocal lenses. The user's vision may also, for example, be impaired as a result of the natural deterioration of the eye due to age, causing such things as near-sightedness, far-sightedness, blurriness, limited peripheral vision, or other such defects. Such facts about stable characteristics of the user's vision may be manually entered via a keyboard into the video processor 1200. The video processing system 1000 may further comprise one or more sensors 1600 to detect changes in the physiological state of the user that may affect the user's vision. For example, the user's level of workload, fatigue, or drowsiness could affect the user's field of view.

The video processor 1200 then modifies in real-time the video feed to produce a deteriorated video feed based on the received visual-perception inhibitors so that the deteriorated video feed more closely resembles what the user sees. For example, the video processor 1200 could crop the video feed so that the angle of view of the deteriorated video feed is roughly the same as the field of view of the user. As another example, the video processor 1200 could make the video feed blurry or cause the images in the video feed to shake. The deteriorated video feed may be presented in real-time to a third party, such as an instructor, on a display module of the video processor 1200 reviewing the user in the interactive computer simulator. The deteriorated video feed may also be stored for later review by the user or by a third party.

Figure 3:
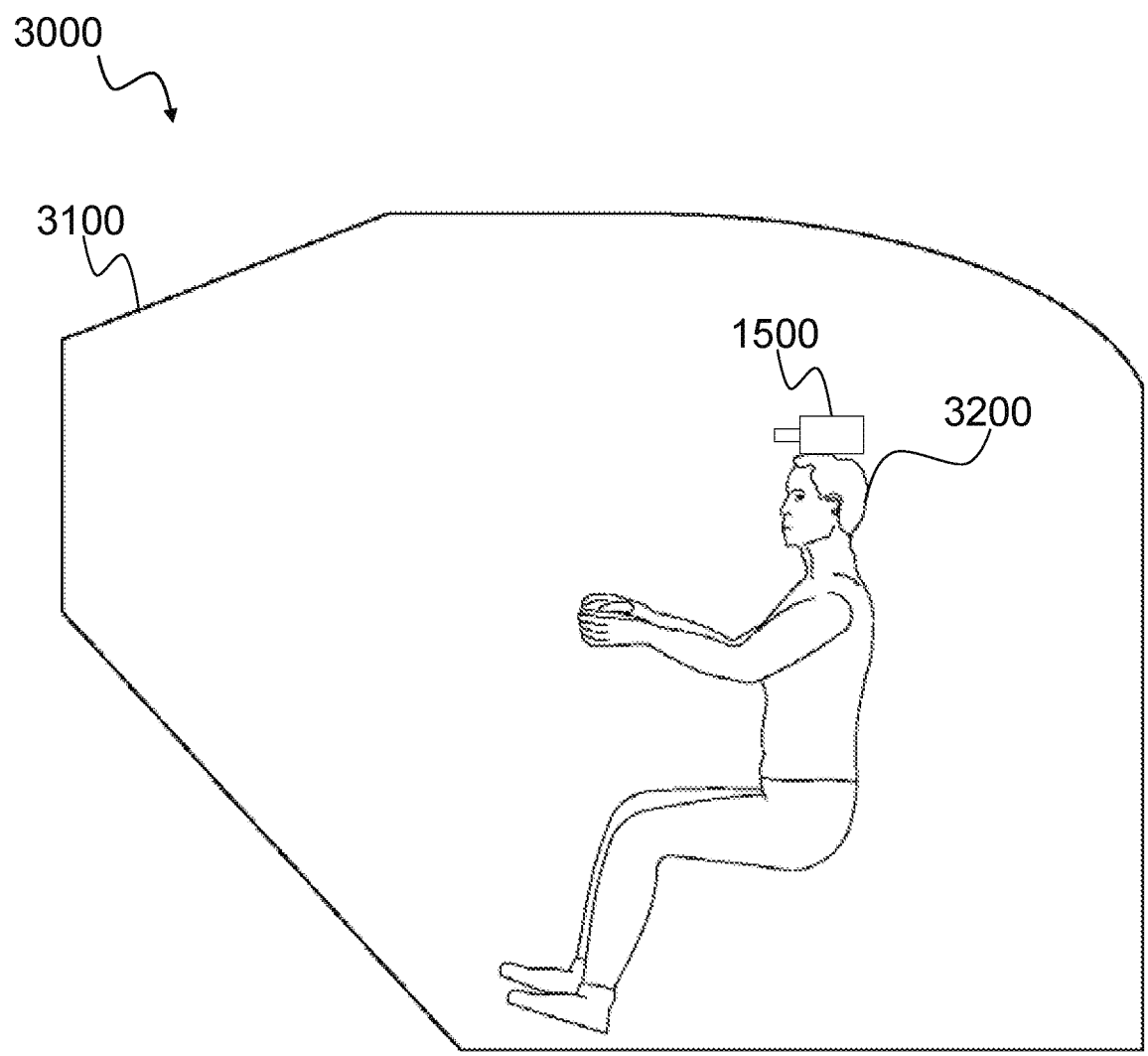
FIG. 3 is a diagram of an exemplary user seated within an enclosed area (e.g., enclosed room) of a simulator or other system.

Reference is now made concurrently to FIGS. 1 and 3. FIG. 3 shows a user 3200 seated within an enclosed area 3100 of an exemplary interactive computer simulator 3000. In a preferred embodiment, the enclosed area 3100 may be a room comprising a cockpit of a flight simulator 3000. In an alternative embodiment, the enclosed area may be an operating room within an operating room simulator (not shown). A skilled person will understand that the enclosed area could be any enclosed area for any interactive computer simulator that presents a user with virtual or physical instruments that the user interacts with to control the simulator from within the enclosed area. It is further possible that the enclosed area could be a cockpit 3100 within an actual aircraft 3000, or that the enclosed area could be an actual operating room within a hospital. That is, the present invention also applies to non-simulator scenarios.

In the depicted example in FIG. 1, the video processing system 1000 comprises a video processor 1200. The video processor 1200 is a computer and comprises a memory module 1220, a processor module 1230 and a network interface module 1210. The processor module 1230 may represent a single processor with one or more processor cores or an array of processors, each comprising one or more processor cores. In some embodiments, the processor module 1230 may also comprise a dedicated video processing module 1232. The video processing module 1232 may be integrated with the processor module 1230, or alternatively may be separate from the processor module 1230. Alternatively, the video processing module 1232 may be implemented in software and a logical component of the processor module 1230. The dedicated video processing module 1232 may be required, for instance, when the video processor 1200 must modify the video feed in real-time, which requires extensive video manipulation and generation capabilities to maintain expected quality of the video for a third party, such as an instructor, observing the simulation remotely in real-time as it is happening. The memory module 1220 may comprise various types of memory (different standardized or kinds of Random Access Memory (RAM) modules, memory cards, Read-Only Memory (ROM) modules, programmable ROM, etc.). The network interface module 1210 represents at least one physical interface that can be used to communicate with other network nodes. The network interface module 1210 may be made visible to the other modules of the video processor 1200 through one or more logical interfaces. The actual stacks of protocols used by the physical network interface(s) and/or logical network interface(s) 1212, 1214, 1216 of the network interface module 1210 do not affect the teachings of the present invention. The variants of processor module 1230, memory module 1220 and network interface module 1210 usable in the context of the present invention will be readily apparent to persons skilled in the art.

The present invention is not affected by the way the different modules exchange information between them. For instance, the memory module 1220 and the processor module 1230 could be connected by a parallel bus, but could also be connected by a serial connection or involve an intermediate module (not shown) without affecting the teachings of the present invention.

Likewise, even though explicit mentions of the memory module 1220 and/or the processor module 1230 are not made throughout the description of the various embodiments, persons skilled in the art will readily recognize that such modules are used in conjunction with other modules of the video processor 1200 to perform routine as well as innovative steps related to the present invention.

Optionally, the video processor 1200 may comprise a storage module 1400 for storing the deteriorated video feed. FIG. 1 shows examples of the storage module 1400 as a distinct storage module 1400B and a distinct module 1400A of the video processor 1200. The storage module 1400 may comprise one or more logical or physical as well as local or remote hard disk drive (HDD) (or an array thereof). The storage module 1400 may further comprise a local or remote database made accessible to the video processor 1200 by a standardized or proprietary interface or via the network interface module 1210. The variants of storage module 1400 usable in the context of the present invention will be readily apparent to persons skilled in the art.

Optionally, the video processor 1200 may comprises a display device 1100 for displaying the deteriorated video feed and/or the original video feed. The display device 1100 may further be for displaying a graphical user interface (GUI) enabling a third party user, such as an instructor, to interact with the video processor 1200. The GUI may provide such functionality as play, stop, rewind, fast-forward, and video-annotation. The display device 1100 may comprise one or more display screens such as a wired or wireless flat screen, a wired or wireless touch-sensitive display, a tablet computer, a portable computer or a smart phone. The display device 1100A is shown as integrated or connected directly to the video processor 1200. The display device 1100B is also shown as remotely connected to the video processor 1200 through the network 1300.

The video processor 1200 further comprises an input module 1240 for receiving visual-perception inhibitors. For example, the input module 1240 may be connected to a keyboard and mouse enabling a third party use of the video-processor 1200 to enter features or characteristics about the user 3200 of the interactive computer simulator 3000 that would negatively affect the user's 3200 vision. As another example, the input module 1240 could be connected to sensors 1600 connected to the user 3200 for measuring changes in the physiological condition of the user 3200 that could negatively affect the user's vision. As another alternative, the sensors 1600 could be remotely connected to the video processor 1200 through the network 1300 such that the input module 1240 receives the visual-perception inhibitors from the network interface module 1210.

The video processing system 1000 may comprise a network 1300. Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on links. Likewise, any number of routers and/or switches (not shown) may be present on links, which may further transit through the Internet.

The video processing system 1000 further comprises one or more cameras 1500. The cameras are located remotely from the video processor 1200 within the enclosed area 3100 of the interactive computer simulator 3000. FIG. 3 depicts the camera 1500 located on the head of the user 3200. In this manner, the camera 1500 automatically tracks the field of view of the user 3200 as the user 3200 moves his or her head. The camera 1500 may be any digital or analog video camera. The camera 1500 may be directly connected to the video processing module 1232 of the video processor 1200 via the video input port 1218 using a video cable such as HDMI, DisplayPort, DVI, or VGA. Alternatively, the camera 1500 may be indirectly connected to the video processing module 1232 through the network 1300. In this case, the camera 1500 or an associated apparatus converts the video feed into data packets prior to sending said video feed to the video processor 1200 via the network 1300. As another alternative, the one or more cameras 1500 may include a 360 degree camera (for example, on the ceiling of the enclosed area 3100), which tracks the field of view of the user 3200 by switching the perspective from which the 360 degree camera provides the video feed. The 360 degree camera does not itself need to move in order to track the field of view of the user 3200

The video processing system may optionally further comprise one or more sensors 1600. The sensors 1600 are generally located within the enclosed area 3100 of the interactive computer simulator 3000 and are for measuring changes in the physiological characteristics of the user 3200 that may affect the vision of the user 3200. The sensors 1600 may be connected directly to the video processor 1200 via the input module 1240. Alternatively, the sensors 1600 may be connected indirectly to the video processor via the network 1300, in which case the input module 1240 may receive the data from the sensors 1600 from the network interface module 1210. Examples of such sensors 1600 include electroencephalographs, electrocardiographs, thermometers, and eye-tracking instruments. The sensors 1600 could further include a sensor for measuring the dilation of the pupil of the user 3200. In general, such sensors 1600 may be connected to or in proximity to the body of the user 3200. However, it is also possible that one or more of the sensors be integrated in the enclosed area 3100 in order to measure changes in the interactive computer simulator 3000 that could affect the vision of the user 3200. For example, one or more of the sensors 1600 could be used to measure the g-forces on the user or a sudden change in altitude.

An Instructor Operating Station (IOS) may be provided for allowing various management tasks (not shown) to be performed in the interactive computer simulator 3000. The tasks associated with the IOS allow for control and/or monitoring of one or more ongoing interactive computer simulations. For instance, the IOS may be used for allowing an instructor to participate to the interactive computer simulation and possibly additional interactive computer simulation(s). In other embodiments, the IOS may be co-located with the interactive computer simulator (e.g., within the same room or simulation enclosure) or remote therefrom (e.g., in different rooms or in different locations). The IOS may provide a computer simulation management interface, which may be displayed on a dedicated IOS display module (not shown) or on the display device 1100 of the video processor 1200. The IOS could be located in close proximity with the video processor 1200, but may also be provided remotely from the video processor 1200, in communication therewith. In a preferred embodiment, the video processor 1200 may be located within the IOS. The computer system of the IOS may be the same as the video processor 1200.

Reference is now concurrently made to FIGS. 1, 2, and 3, where FIG. 2 shows a flow chart of an exemplary method 2000 in accordance with the teachings of a first embodiment of the present invention. The method 2000 allows for creating a deteriorated video feed from actions of a user. The method 2000 comprises in an enclosed area 3100, providing 2010 one or more tangible instruments (not shown) of a system 3000 on which the user performs the actions. In a preferred embodiment, the enclosed area 3100 may be an enclosed room comprising a cockpit of an aircraft simulator 3000. In this case, the tangible instruments are the instrument panel of an aircraft. The tangible instruments are actual physical instruments that user 3200 can manually manipulate and which may include for example a throttle, a steering wheel or stick, and controllers for the flaps. The aircraft simulator 3000 may include one or more virtual instruments as well. In performing actions on the instrument panel of the aircraft, the user 3200 controls the aircraft in the aircraft simulator 3000. As another option, the enclosed area 3100 may be an operating room within a hospital. In this case, the tangible instruments are the standard medical tools and instruments commonly found in a hospital operating room. A skilled person will understand that the enclosed area 3100 could be the enclosed area 3100 for many different types of interactive computer simulators 3000 (e.g., a paramedic vehicle simulator or a paramedic-related scene simulator). A skilled person will further understand that the present invention is not limited to interactive computer simulators. For example, the enclosed area 3100 may be the cockpit of an actual aircraft, an actual hospital operating room, an actual paramedic vehicle, or an actual paramedic-related scene.

The method 2000 further comprises receiving 2020 a video feed, through a video input port 1218, from one or more cameras 3200, within the enclosed area 3100, providing images related to the actions performed by the user 3200 interacting with the system 3000 through the one or more tangible instruments. In general, the one or more cameras are placed within the enclosed area 3100 and are placed within the enclosed area 3100 so as to capture the user's 3200 actions on the tangible instrument panel from the point of view of the user 3200. In one embodiment of the present invention, at least one camera 1500 is located on the body of the user 3200, and in particular on the head of the user 3200. In this manner, the camera 1500 automatically tracks the point of view of the user 3200 as the user 3200 moves his or her head. The camera 3200 may be directed in the same direction as the ideas of the user 3200. The angle of view of the camera 1500 is preferably wider than the field of view of the user such that the camera 1500 captures at least as much of the enclosed area 3100 that is captured within the field of view of the user 3200. The camera 1500 may alternatively be located on another body part of the user 3200, such as the user's 3200 chest. As a further alternative, the one or more cameras may be located throughout the enclosed area. In this case, at least one of the sensors 1600 may be an eye-tracking instrument. The video feed may be selected from among the one or more cameras 1500 around the enclosed area 3100 based on the direction of gaze of the user 3200. Alternatively, one or more of the cameras 1500 may be able to move such that the direction of the cameras 1500 can be adjusted based on changes in the direction of gaze of the user 3200. The video feed from the one or more cameras 1500 is then fed to the video processor 1200 either directly through the video input port 1218 of the video processing module 1232, or alternatively through the network 1300. In the latter case, either the cameras 1500 or a separate device (not shown) convers the analog or digital video feed from the cameras 1500 into data packets for transmission on the network 1300. The video processing module 1232, or the video input port 1218 thereof, may then receive the video feed as data packets from the network interface module 1210. The video processing module 1232 may then convert the data packets to an analog or digital video feed for further processing.

The method 2000 further comprises capturing 2030 one or more visual-perception inhibitors affecting the user 3200, wherein the one or more visual-perception inhibitors affect the user 3200 while performing the actions in the system 3000. A visual-perception inhibitor is any human or other factor that may affect the user's vision while using the system 3000. A visual-perception inhibitor could be a stable human factor that does not substantially change while the user is using the system 3000. Such visual-perception inhibitors may include a defect in the user's 3200 eye that results in the user 3200 having a reduced peripheral vision compared to the average, or the fact that the user 3200 wears glasses or contacts resulting in a blurry peripheral vision. Further, the user 3200 may wear glasses with bifocal lenses. A visual-perception inhibitor may also comprise human factors that change dynamically throughout the use of the system 3000. For example, the user's 3200 pupils may dilate resulting in a change in the contrast for the user. As another example, the user 3200 may become fatigued or stressed resulting in other changes to the user's 3200 vision. As another example, the user 3200 may experience tunnel vision, where the user 3200 gazes at a particular display for too long.

In some cases, the visual-perception inhibitors could be inputted manually into the video processor 1200 by the user 3200 or a third party, such as an instructor prior to the user 3200 using the system 3000. Alternatively, one or more sensors 1600 may be used to measure changes in the physiological characteristics of the user 3200. Examples of such sensors 1600 include electroencephalographs, electrocardiographs, thermometers, eye-tracking instruments, and eye-level or eye-orientation measurement instruments. Such sensors may then send their physiology data to the video processor 1200 via the input module 1240 or via the network 1300. A third party user of the video processor 1200 may then interpret the physiology data and manually input the visual-perception inhibitors into the video processor 1200 via a keyboard and mouse (not shown) using a GUI of the display device 1100. Alternatively, the video processor may automatically convert the physiology data from the sensors 1600 to visual-perception inhibitors. As a further alternative, the sensors 1600 or a device (not shown) associated with the sensors 1600 could automatically convert the physiology data to visual-perception inhibitors. In a preferred embodiment, the physiological data is converted automatically and in real-time to ensure that the video feed can be processed, modified, and displayed in real-time.

Various neuroscience, medical, psychological, human behavioral, and other scientific research enables the correlating of the physiological data with visual perception inhibitors. For example, the dilation of the pupils of the user 3200 may be correlated with a change in the contrast of the user's 3200 vision. As another example, an increase in the heartrate of the user 3200 may be correlated with increased stress which may be further correlated with a negative effect on the user's 3200 vision or reduced ability to hear aural signals or alarms. Similarly, certain patterns of blinking, pupillary response, and electrical signals in the brain may be correlated with certain effects on the user's 3200 vision. Likewise, an eye-tracking sensor may determine that the user 3200 is experiencing tunnel vision, in which case the user's 3200 peripheral vision may be restricted. One or more sensors 1600 may detect certain physiological characteristics of the user 3200 correlated with a blackout or partial blackout. Such scientifically established correlations may be used either by third-party user interpreting the physiological data or by the video processor 1200 or other device in automatically converting the physiological data to visual-perception inhibitors.

The visual-perception inhibitors could further include non-human factors that could influence the user's vision. For example, a sensor 1600 could measure the g-forces being exerted on the user 3200, which would be an external cause that could affect the vision of the user 3200, for example by reducing the field of view of the user. A person skilled in the art will recognized that such g-forces could result in the user 3200 having a blackout or partial blackout, which could be detected by another sensor 1600.

The method 2000 further comprising at a video processing module 1232, deteriorating 2040 the video feed by selectively modifying images from the video feed into a deteriorated video feed considering the captured one or more visual-perception inhibitors. The video processing module 1232 modifies the video feed 1232 to make it more closely resemble what the user 3200 sees. The modification of the video feed is done in consideration of the video-perception inhibitors. For example, if the user 3200 has a restricted field of view, the video processing module 1232 may crop the images of the video feed so that the angle of view of the video feed is roughly the same as the field of view of the user 3200. If the user has a blurry peripheral vision, the video processing module 1232 may make the periphery of the images from the video feed blurry. If the user's 3200 pupils dilate, the video processing module 1232 may modify the contrast of the images in the video feed. If the user 3200 blacks out, the video processing module 1232 may fade out to black the images of the video feed. If the user 3200 has tunnel vision, the video processing module 1232 may crop the images of the video feed so that the angle of view of the video feed is similar to that of the user's 3200. If the user 3200 experiences fatigue and/or stress, the video processing module 1232 may make the images or parts thereof of the video feed blurry and in particular may make text appearing in those images blurry. The video processing module 1232 may make other non-focus elements in the images blurry. If the user 3200 wears bifocal glasses, the video processing module 1232 may modify the images of the video feed to resemble bifocal glasses, such as by making the bottom part or the upper part of said images blurry. If the user 3200 experiences high g-forces, the video processing module 3200 may make the images of the video feed blurry or fade out to black. If the enclosed area 3100 shakes, the video processing module 1232 make shake the images of the video feed. If the user 3200 rotates his or her head, the video processing module 1232 might rotate the images of the video feed. A skilled person will understand that the correlations provided here between the physiological state of the user 3200 and the modifications of the images of the video feed are offered merely as examples and that the same physiological states may result in a different modification to the images of the video feed and that the same modifications to the video feed may result from different physiological states.

Optionally, the method 2000 may further comprise a display module 1100 for displaying the deteriorated video feed. The deteriorated video feed produced by the video processing module 1232 may displayed in real-time on a display module 1100 of the video processor 1200 so that a third-party user, such as an instructor, may observe the user 3200 during the interactive computer simulation. Alternatively, the deteriorated video feed may be stored and later reviewed on the display module 1100 of the video processor 1200 by either the third-party user or the user 3200 of the interactive computer simulator 3000. The display module 1100 may further be for displaying a graphical user interface (GUI) enabling a third-party user, such as an instructor, to interact with the video processor 1200. The GUI may provide such functionality as play, stop, rewind, fast-forward, and video-annotation. The display module 1100 may comprise one or more display screens such as a wired or wireless flat screen, a wired or wireless touch-sensitive display, a tablet computer, a portable computer or a smart phone. The display module 1100A is shown as integrated or connected directly to the video processor 1200. The display module 1100B is also shown as remotely connected to the video processor 1200 through the network 1300.

Optionally, the method 2000 may further comprise a storage module 1400 for storing the deteriorated video feed. The deteriorated video feed produced by the video processing module 1232 may be stored on a storage module 1400 for later viewing by either a third-party user, such as an instructor, or the user 3200 of the interactive computer simulator 3000. The original video feed may also be stored on the storage module 1400. In storing the video feed, the video processor may compress the video feed images. FIG. 1 shows examples of the storage module 1400 as a distinct storage module 1400B and a distinct module 1400A of the video processor 1200. The storage module 1400 may comprise one or more logical or physical as well as local or remote hard disk drive (HDD) (or an array thereof). The storage module 1400 may further comprise a local or remote database made accessible to the video processor 1200 by a standardized or proprietary interface or via the network interface module 1210. The variants of storage module 1400 usable in the context of the present invention will be readily apparent to persons skilled in the art. The storage module 1400 may further be a USB key or other type of removable and portable storage device.

Optionally, the one or more cameras 1500 have a video-feed angle of view and wherein deteriorating the video feed comprises cropping the images considering an effective visual field of the user, the effective visual field being within the video-feed angle of view. Preferably, the angle of view of the cameras 1500 is wider than the field of view of the user 3200 such that the images of the video feed captured by the cameras 1500 includes everything that the user 3200 sees within his or her field of view. The video processing module 1232 may then modify the images of the video feed by cropping them so that the angle of view of the images of the video feed is similar to the field of view of the user, and a third-party user watching the video feed on the display module 1100 will see roughly the same field of view as the user. Moreover, in cropping the images of the video feed the video processing module 1232 may base the cropping on the average field of view for a human being. Alternatively, the video processing module 1232 may crop the images of the video feed based on specific information about the field of view of the specific user 3200, for example from the results of a Humphrey's visual field test. The effective visual field of the user 3200 could defined either as the possible visual field of the user 3200 or the actual visual field of the user 3200. The possible visual field of the user 3200 is the visual field of the user 3200 determined by the physical or structural capabilities of the user's 3200 eyes. The actual field of view of the user 3200 is that part of the possible visual field of the user 3200 that the user actually sees or is aware of as a result of the cognitive processing of the visual information provided by the eyes. Generally, the actual visual field of the user 3200 will be smaller than the possible visual field of the user 3200, or at least no greater than the possible visual field of the user 3200. Moreover, while the possible visual field of the user 3200 will generally remain stable over short periods of time, such as over the course of a simulation, the actual visual field of the user 3200 may change dynamically over short periods of time as a result of a plurality of different factors such as fatigue, workload, stress, and physical causes such as g-forces. The video processor 1200 may provide a physical or virtual (through the GUI) toggle switch for switching the effective visual field of the user 3200 between the possible and actual visual field of the user 3200. If the toggle switch is set to the actual visual field of the user 3200, more of the video feed may be cropped than if the switch is set to the possible visual field of the user 3200.

Optionally, the method 2000 wherein deteriorating the video feed comprises rotating the video feed in response to changes in the eye-level or eye-orientation of the user. One or more of the sensors 1600 may measure the eye-level or eye-orientation of the user. If said sensors 1600 detect that the user 3200 has rotated his or her head, the video processing module 1232 may rotate the images of the video feed.

Optionally, the method 2000 wherein the input module 1240 is further for automatically capturing movements of the user and moving at least one of the one or more cameras 1500 in response to such movements. One or more of the sensors 1600 may track the movements of the user 3200, the user's head, or the user's eyes. One or more of the cameras 1500 may then be moved in response to such movements of the user so that the cameras 1500 track the gaze of the user 3200.

Optionally, the method 2000 wherein the system 3000 may be an operating room simulator or an actual operating room, the enclosed area 3100 may be an operating room, and the user 3200 may be a medical practitioner, such as a doctor or a nurse. The user 3200 may not be sitting. There may be more than one user 3200 in the operating room 3100. The tangible instruments may comprise the standard medical instruments, devices, and tools commonly found in an operating room such as cutters, thermometers, stethoscopes, and monitors. The operating room 3100 may also provide one or more patients or simulated patients for surgery. The simulated operating room may also provide one or more virtual simulated elements, such as other medical practitioners, a virtual window to another part of the hospital, or information from outside the operating room 3100, such as other emergencies or events. On or more cameras 1500 may be located on the bodies, and in particular on the head, of one or more of the medical practitioners 3200. Alternatively, there may be one or more cameras 1500 located around the operating room. In the case where there is more than one user 3200, the video processor 1200 may generate more than one video feed, at least one for each user 3200 from that user's 3200 point of view. There may further be one or more cameras 1500 specifically for a getting a close-up view of the patient at the location of the surgery from the point of view of the surgeon. The operating room 3100 may contain motion sensors to track the movement of the users 3200 as well as changes in the direction of their gaze.

Figure 4:
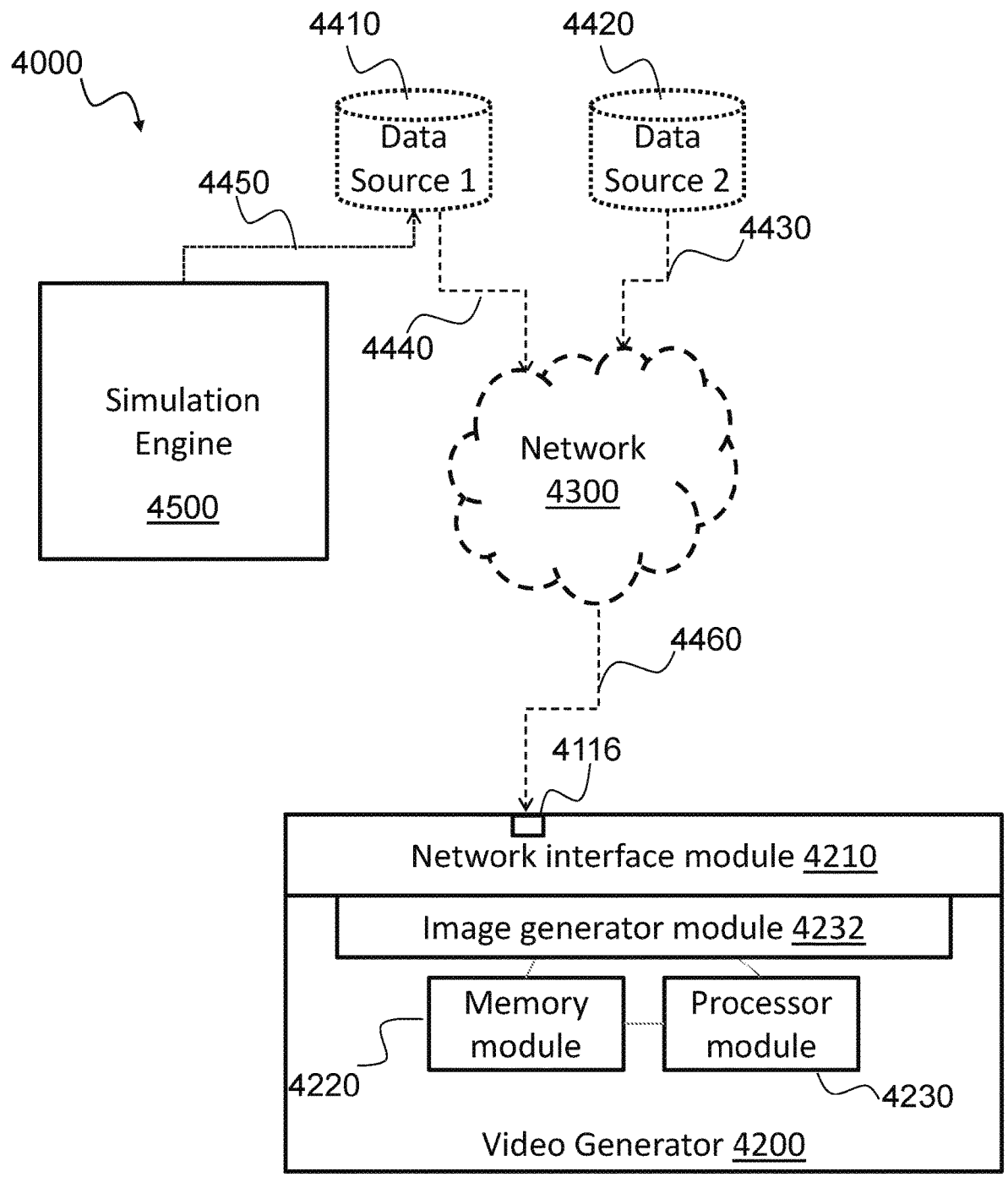
FIG. 4 is a logical modular representation of an exemplary system comprising a video generator for rendering a stream of images, in accordance with the teachings of the present invention.

Reference is now made to FIG. 4 which shows a logical modular view of an exemplary video generation system 4000 in accordance with the teachings of a second embodiment the present invention. The video generation system 4000 comprises an interactive flight simulator that comprises an enclosed area (i.e., the cockpit) with a user seated therein. The flight simulator provides the user with a tangible instrument panel for controlling the simulated aircraft within the flight simulator. The flight simulator may also provide virtual instruments and other virtual elements. For example, the flight simulator provides a virtual view through the windows of the cockpit. The flight simulator further includes a simulation engine 4500 that controls the simulated environment and updates the simulated environment in response to the actions taken by the user of the computer simulator. The simulation engine 4500 generates in real-time a sequence of events occurring within the simulation. Some of these events may be the result of actions taken by the user on the tangible instrument panel. For example, the user increases power to the engines so that the simulated aircraft begins to take-off, or the user banks the simulated aircraft to the right. Other of these events may be generated by the simulated environment itself or by an instructor observing the simulation. For example, such an event may include a storm, a communication from the tower, or the appearance of another aircraft on the horizon. The events from the simulation engine 4500 are sent to a first database 4410. The first database 4410 may either be directly connected to the simulation engine 4500 via a cable 4450, or alternatively the first database 4410 may be connected to the simulation engine via the network 4300. The first database 4410 stores the events from the simulation engine 4500 on a storage module. The video generation system 4000 further includes a second database 4420 that includes 2D texture images of the interior of the cockpit of the flight simulator.

The video generation system 4000 further includes a video generator 4200. The video generator 4200 is a computer comprising a network interface module 4210, a memory module 4220, a processor module 4230, and an image generator module. The video generator 4200 receives simulation events from the first database 4410, the 2D texture images from the second database 4420, and one or more wire frame model images of the interior of the cockpit of the flight simulator through the network 1300 from the interface 4116 of the network interface module 4210. The video generator 4200 determines the field of view of the user within the cockpit of the flight simulator. This may be done statically or dynamically. For example, the field of view of the user may be roughly estimated based on the position of the seat within the cockpit and the height of the user. Alternatively, sensors may be used to track the position of the user within the cockpit such that the video generator 4200 is able to dynamically track the field of view of the user as the user moves his or her hear or moves around the cockpit. The image generator module 4232 of the video generator 4200 renders in real-time a 3D stream of images of the field of view of the user within the cockpit of the flight simulator that approximates what the user actually sees using the sequence of events from the first database 4410, the 2D texture images from the second database 4420, and the wire frame models of the cockpit of the flight simulator. The video of this stream of images may be displayed on a display module of the video generator enabling a third-party user, such as an instructor, to observe the simulation in real-time. The video of the stream of images may also be stored on a storage module of the video generator 4200 enabling the third-party user or the user of the flight simulator to review the simulation at a later time.

Figure 6:
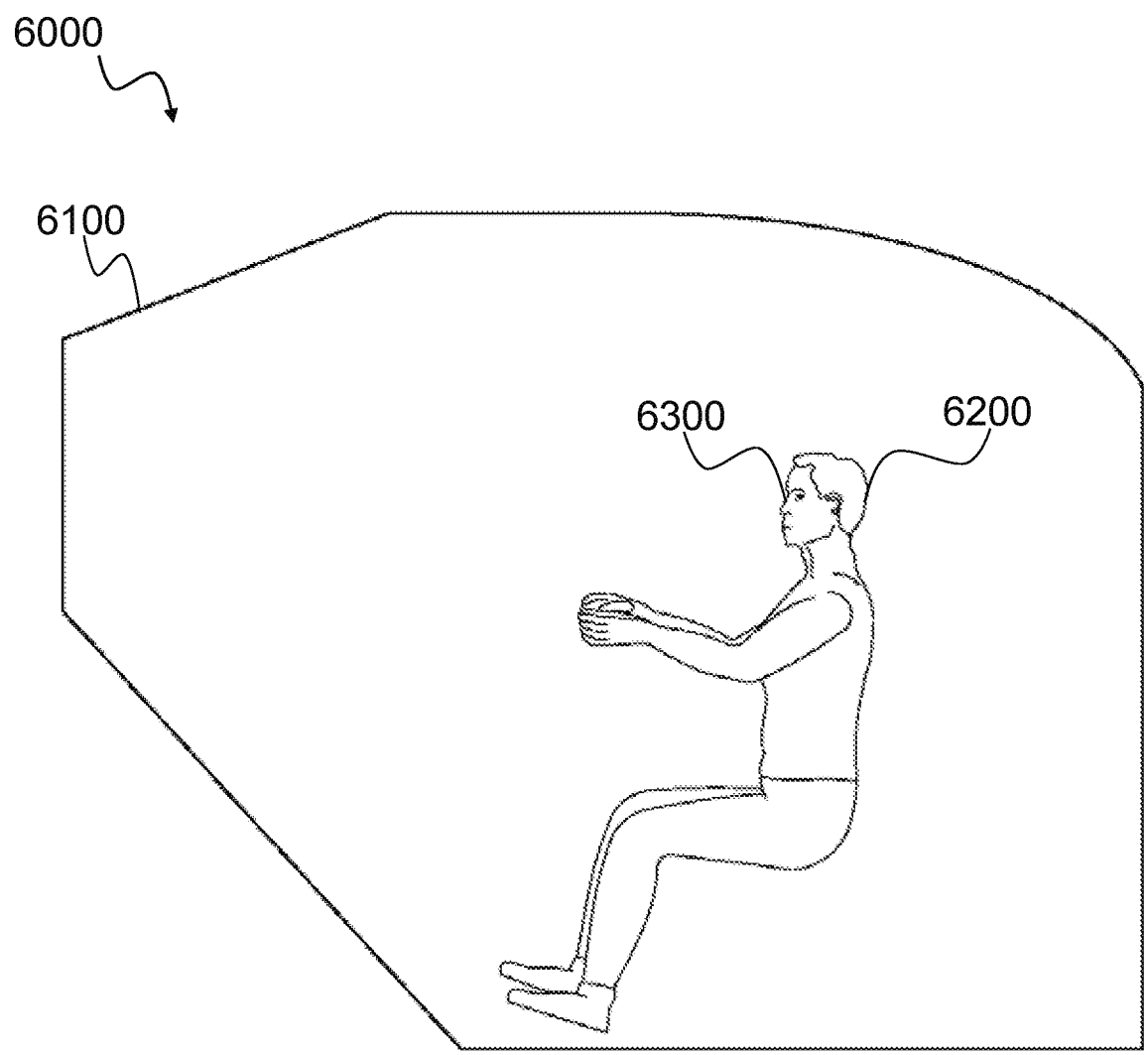
FIG. 6 is a diagram of an exemplary user seated within an enclosed area of a simulator or other system.

Reference is now made concurrently to FIGS. 4 and 6. FIG. 6 shows a user 6200 seated within an enclosed area 6100 of an exemplary interactive computer simulator 6000. In a preferred embodiment, the enclosed area 6100 may be a cockpit of a flight simulator 6000. In an alternative embodiment, the enclosed area 6100 may be an operating room within an operating room simulator (not shown). A skilled person will understand that the enclosed area 6100 could be any enclosed area for any interactive computer simulator that presents a user with virtual or physical instruments that the user interacts with to control the simulator within the enclosed area (e.g., a paramedic vehicle simulator or a paramedic-related scene simulator). It is further possible that the enclosed area 6100 could be an enclosed room comprising a cockpit 6100 within an actual aircraft 6000, or that the enclosed area 6100 could be an actual operating room within a hospital. That is, the present invention also applies to non-simulator scenarios (e.g., a paramedic vehicle or a paramedic-related scene).

In the depicted example in FIG. 4, the video generation system 4000 comprises a video generator 4200. The video generator 4200 is a computer and comprises a memory module 4220, a processor module 4230 and a network interface module 4210. The processor module 4230 may represent a single processor with one or more processor cores or an array of processors, each comprising one or more processor cores. In some embodiments, the processor module 4230 may also comprise a dedicated image generator module 4232. The image generator module 4232 may be integrated with the processor module 4230, or alternatively may be separate from the processor module 4230. Alternatively, the image generator module 4232 may be implemented in software and a logical component of the processor module 4230. The dedicated image generator module 4232 may be required, for instance, when the video generator 4200 must generate images in real-time, which requires extensive video generation capabilities to maintain expected quality of the video for a third party user, such as an instructor, observing the simulation in real-time as it is happening. The memory module 4220 may comprise various types of memory (different standardized or kinds of Random Access Memory (RAM) modules, memory cards, Read-Only Memory (ROM) modules, programmable ROM, etc.). The network interface module 4210 represents at least one physical interface that can be used to communicate with other network nodes. The network interface module 4210 may be made visible to the other modules of the video generator 4200 through one or more logical interfaces. The actual stacks of protocols used by the physical network interface(s) and/or logical network interface(s) 4116 of the network interface module 4210 do not affect the teachings of the present invention. The variants of processor module 4230, memory module 4220 and network interface module 4210 usable in the context of the present invention will be readily apparent to persons skilled in the art.

The present invention is not affected by the way the different modules exchange information between them. For instance, the memory module 4220 and the processor module 4230 could be connected by a parallel bus (not shown), but could also be connected by a serial connection or involve an intermediate module (not shown) without affecting the teachings of the present invention.

Likewise, even though explicit mentions of the memory module 4220 and/or the processor module 4230 are not made throughout the description of the various embodiments, persons skilled in the art will readily recognize that such modules are used in conjunction with other modules of the video generator 4200 to perform routine as well as innovative steps related to the present invention.

Optionally, the video generator 4200 may comprise a storage module (not shown) for storing the generated video feed. The storage module may be a distinct module or a module of the video generator 4200. The storage module may comprise one or more logical or physical as well as local or remote hard disk drives (HDD) (or an array thereof). The storage module may further comprise a local or remote database made accessible to the video generator 4200 by a standardized or proprietary interface or via the network interface module 4210. The variants of the storage module usable in the context of the present invention will be readily apparent to persons skilled in the art.

Optionally, the video generator 4200 may further comprise an input module for receiving visual-perception inhibitors. For example, the input module may be connected to a keyboard and mouse enabling a third party use of the video generator 4200 to enter features or characteristics about the user 6200 of the interactive computer simulator 6000 that would negatively affect the user's 6200 vision. As another example, the input module could be connected to sensors (not shown) connected to the user 6200 for measuring changes in the physiological condition of the user 6200 that could negatively affect the user's vision. As another alternative, the sensors could be remotely connected to the video generator 4200 through the network 4300 such that the input module receives the visual-perception inhibitors from the network interface module 4210.

The video generation system further comprises a first storage module 4410 and a second storage module 4420. The first storage module 4410 is for receiving and storing the sequence of events from the simulation engine 4500. The second storage module 4420 is for storing the texture images of the enclosed area 6100 of the interactive computer simulator 6000. The storage modules 4410 and 4420 may be distinct modules or modules of either the simulation engine 4500 or the video generator 4200. Likewise, a skilled person will understand that the storage modules 4410 and 4420 may be implemented as a single distinct storage module. The storage modules 4410 and 4420 may comprise one or more logical or physical as well as local or remote hard disk drives (HDD) (or an array thereof). The storage modules 4410 and 4420 may further comprise a local or remote database made accessible to the video generator 4200 and the simulation engine 4500 by a standardized or proprietary interface or via the network 4300. The variants of the storage modules 4410 and 4420 usable in the context of the present invention will be readily apparent to persons skilled in the art.

Optionally, the video generator 4200 may comprise a display device (not shown) for displaying the generated video feed. The display device may further be for displaying a graphical user interface (GUI) enabling a third party user, such as an instructor, to interact with the video generator 4200. The GUI may provide such functionality as play, stop, rewind, fast-forward, and video-annotation. The display device may comprise one or more display screens such as a wired or wireless flat screen, a wired or wireless touch-sensitive display, a tablet computer, a portable computer or a smart phone. The display device may be integrated or connected directly to the video generator 4200. The display device may also be remotely connected to the video generator 4200 through the network 4300.

The video generation system 4000 may comprise a network 4300. Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on links. Likewise, any number of routers and/or switches (not shown) may be present on links, which may further transit through the Internet.

An Instructor Operating Station (IOS) may be provided for allowing various management tasks (not shown) to be performed in the interactive computer simulator 6000. The tasks associated with the IOS allow for control and/or monitoring of one or more ongoing interactive computer simulations. For instance, the IOS may be used for allowing an instructor to participate in the interactive computer simulation and possibly additional interactive computer simulation(s). In other embodiments, the IOS may be co-located with the interactive computer simulator (e.g., within the same room or simulation enclosure) or remote therefrom (e.g., in different rooms or in different locations). The IOS may provide a computer simulation management interface, which may be displayed on a dedicated IOS display module (not shown) or on the display device of the video generator 4200. The IOS could be located in close proximity with the video generator 4200, but may also be provided remotely from the video generator 4200, in communication therewith through the network 4300. In a preferred embodiment, the video generator 4200 may be located within the IOS. The computer system of the IOS may be the same as the video generator 4200.

The video generation system 4000 further comprises a simulation engine 4500. The simulation engine 4500 is a computer comprising a processor module, a memory module, a storage module, and a network interface module (not shown). The simulation engine 4500 performs one or more interactive computer simulations within the simulator 6000. Each interactive computer simulation provides a virtual environment and various tangible instruments (or controls) to allow enactment of different scenarios for the purpose of training one or more users (or trainees), using one or more of the virtual simulated elements, in the operation and/or understanding of the corresponding one or more actual systems. The simulation engine 4500 presents an initial simulated scenario to the user 6200 within the enclosed area 6100 of the simulator 6000. The user performs one or more actions within the simulated environment using the tangible instruments provided to the user 6200. As a result events occur within the simulated environment. Further events may occur that are generated by the simulation engine 4500 rather than by the user 6200. The simulated engine 4500 sends this sequence of events to the first data storage module 4410 for storage. The first storage module 4410 may be integrated with the simulation engine 4500. Alternatively, the first storage module 4410 may be directly connected to the simulation engine by cable 4450. As a further alternative, the storage module 4410 may be connected to the simulation engine via the network 4300.

Reference is now concurrently made to FIGS. 4, 5, and 6, where FIG. 5 shows a flow chart of an exemplary method 5000 in accordance with the teachings of a second embodiment of the present invention. The method 5000 allows for generating a stream of images representing a sequence of events related to a system 6000. The method 5000 comprises defining 5010 a field view of a user 6200 from a 3D location 6300 within an enclosed area 6100. In a preferred embodiment, the system 6000 is an interactive computer simulator, such as a flight simulator, and the enclosed area 6100 is an enclosed room comprising a cockpit of the flight simulator. Alternatively, the system 6000 may be an operating room simulator. As a further alternative, the system 6000 may be an actual aircraft or operating room within a hospital. The user 6200 may be seated within the enclosed area 6100. The 3D location 6300 within the enclosed area 6100 may be the location of the user's 6200 eyes. This 3D location may be defined statically based on, for example, the location and height of a seat within the enclosed area 6100 on which the user 6200 is sitting. The 3D location may also be defined statically based on the height of the user 6200. Alternatively, the 3D location may be defined dynamically such that it changes throughout the interactive computer simulation as the user moves his or her head or otherwise moves around the enclosed area 6100. For example, the system 6000 may comprise an eye-tracking sensor for tracking movements of the user's 6200 eyes such that the 3D location changes in response to such movements of the user's eyes. The video generator 4200 may receive the dynamically changing 3D location through the network 4300. The field of view of the user 6200 from the 3D location may be defined based on an average field of view for a typical human. Alternatively, the field of view of the user 6200 may be defined based on information known about the user 6200. For example, the user 6200 may have a restricted field of view because of a prior eye defect or because the user 6200 wears glasses or contact lenses. Alternatively, the field of view of the user 6200 may be determined based on the age of the user 6200, using research on average or typical deterioration of the eye with age. As another example, the field of view of the user 6200 may be measured prior to the simulation using a Humphreys Visual Field Analyzer, or some other similar method.

The method 5000 further comprises receiving 5020, through a network 4300 from a first data source 4410, the sequence of events related to the system 6000, the sequence of events comprising actions of the user 6200 performed on one or more tangible instruments of the system 6000 for interacting with the system 6000. The interactive computer simulator further includes a simulation engine 4500 that controls the simulated environment and updates the simulated environment in response to the actions taken by the user 6200 of the computer simulator. The simulation engine 4500 generates in real-time a sequence of events occurring within the simulation. Some of these events may be the result of actions taken by the user on a tangible instrument panel. The enclosed area 6100 provides the user 6200 with a tangible instrument panel. In the case of a flight simulator, the tangible instrument panel are the standard instruments of an aircraft and may include for example a steering wheel, a throttle, an altimeter, and controls for the flaps. In the case of an operating room simulation, the instruments are the standard medical instruments and devices that are available in an operating room. As examples of actions that can be taken by the user 6200 on the instrument panel, the user 6200 may increase power to the engines so that the simulated aircraft begins to take-off, the user 6200 banks the simulated aircraft to the right, the user 6200 raises or lowers the landing gear, or the user 6200 adjusts the flaps. Other of these events may be generated by the simulated environment itself or by an instructor observing the simulation. For example, such an event may include a storm, a communication from the tower, or the appearance of another aircraft on the horizon. In the case of an operating room simulation, events may include movement of a doctor or nurse form a first location to a second location within the enclosed area, receiving a diagnostic measure (such as temperature) from the patient, making an incision, or a change of heartrate of the patient. The events from the simulation engine 4500 are sent to a first database 4410. The first database 4410 may either be directly connected to the simulation engine 4500 via a cable 4450, or alternatively the first database 4410 may be connected to the simulation engine 4500 via the network 4300. The first database 4410 stores the events from the simulation engine 4500 on a storage module. The video generator 4200 may make a request through the network 4300 from the first database 4410 to receive the sequence of events. The sequence of events are sent through the network 4300 to the video generator 4200, which receives said events through the network interface module 4210. Alternatively, the video generator 4200 may be directly connected to the first database 4410 via a cable (not shown), through which the sequence of events are sent. As another alternative, the first database may be a module of the video generator 4200.

The method 5000 further comprises receiving 5030, through the network 4300 from a second data source 4420, images related to the one or more tangible instruments within the field of view of the user 6200 and related to at least a portion of the enclosed area 6100 within the field of view of the user 6200. The images may be texture images of the interior of the enclosed area 6100 that provide the colors and textures used to render 3D images of the enclosed area using wire frame models thereof. Alternatively, the images may be already rendered images of the interior of the enclosed area 6100. The images are stored on the second database 4420. The video generator 4200 may request the images from the second database 4420. The second database 4420 sends the images to the video generator 4200 through the network 4300, where the video generator 4200 receives them via the network interface module 4210. Alternatively, the second database 4420 may be directly connected to the video generator 4200 by a cable (not shown) through which the sequence of events are sent. As another alternative, the second database 4420 may be a module of the video generator 4200. The second database 4420 may send all the images of the enclosed area 6100 to the video generator 4200. Alternatively, the second database 4420 may send a subset of the images of the enclosed area 6100 comprising at least those images that include that part of the enclosed area 6100 that is currently within the field of view of the user 6200. The images sent from the second database 4420 may further include images just outside or on the periphery of the user's field of view for the purpose of caching so that the video feed can be quickly updated if the user 6200 changes the direction of his or her gaze. The images relate to the interior of the enclosed area 6100.

The method 5000 further comprises determining 5040 a virtual camera position in the enclosed area 6100 from the 3D location 6300. The virtual camera position may be the 3D location 6300, i.e., the 3D location within the enclosed area 6100 if the eyes of the user 6200. Alternatively, the virtual camera position may be above and behind the head of the user 6200, or some other location within the enclosed area 6100 that is able to capture the parts of the enclosed area that fall within the user's 6200 field of view. The virtual camera position may be statically defined. Alternatively, the virtual camera position may be dynamically defined such that it changes in response to movements of the user's eyes, head, or body.

The method 5000 further comprises rendering the stream of images from the virtual camera position considering the received sequence of events and the received images. If the images received from the second database 4420 are texture images, then the video generator 4200 further requires a wire frame model of the enclosed area 6100 of the system 6000. The wire frame model may be of the entire enclosed area 6100, or alternatively it may comprise only a subset of the entire enclosed area 6100, notably comprising at least that part of the enclosed area 6100 within the field of view of the user 6200. The video generator 4200 may receive the wire frame model from the simulation engine 4500, from the first database 4410, from the second database 4420, or from some other source (not shown). The wire frame model may alternatively be stored on a storage module of the video generator 4200. The video generator 4200 may receive the wire frame model through the network 4300 or through a direct cable connection. The wire frame model is a 2D graph or representation of the 3D structure of the enclosed area 6100 without any colors or textures. The image generator module 4232 of the video generator 4200 renders in real-time a 3D stream of images form the point of view of the virtual camera position of the field of view of the user 6200 within the enclosed area 6100 of the system 6000 that approximates what the user actually sees using the sequence of events from the first database 4410, the 2D texture images from the second database 4420, and the wire frame models. For example, in a flight simulator if an event in the sequence of events is that the altimeter changes from a first altitude to a second altitude, the image generator module 4232 may render the images of the cockpit such that the altimeter moves from this first altitude to a second altitude. Similarly, if an event in the sequence of events is that the throttle moves from a first position to a second position, the image generator module will render the cockpit showing this movement of the throttle. If instead, the images received from the second database 4420 are rendered images of the enclosed area 6100, rendering the stream of images comprises overlaying an image mask over the images of the enclosed area. That is, the image generator module 4232 of the video generator 4200 renders in real-time a 3D stream of images of the field of view of the user 6200 within the enclosed area 6100 of the system 6000 that approximates what the user actually sees using the sequence of events from the first database 4410, the 3D images from the second database 4420, and 3D mask images. For example, in the case of a flight simulator, if an event in the sequence of events is that the fuel light as turned on, rendering the stream of images comprises overlaying an image of the fuel light being on over the base image of the cockpit. A skilled person will understand that in some cases further images will be needed to render the virtual elements of the simulator. For example, in the case of a flight simulator further images will be required to render the external view through the windows of the flight simulator. The images for the virtual environment within the flight simulator may be provided already rendered to the video generator 4200 from the simulation engine 4500 through the network 4300, such that the video generator 4200 simply overlays the images of the virtual environment over the rendered stream of images. Alternatively, the simulation engine 4500 may provide the video generator with wire frame models and texture images for rendering the virtual elements of the simulated environment such that rendering the stream of images further comprises the image generator rendering the stream of images for the virtual environment within the simulator and combining such images with the rendered stream of images for the enclosed area 6100.

Optionally, the method 5000 may further comprise displaying the rendered stream of images on a display module (not shown). The display module may be integrated with the video generator 4200. Alternatively, the display module may be directly connected to the video generator 4200. As another alternative, the display module may be remove from the video generator 4200 and connected thereto through the network 4300. The stream of images may be displayed in real-time as they are generated by the image generator module 4232 and as the events which they represent are occurring within the simulation engine 4500. Alternatively, the method 5000 may optionally further comprise storing the rendered stream of images on a storage module (not shown) of the video generator 4200. The storage module may be integrated with the video generator 4200, directly connected to the video generator 4200 via a cable, or remote from the video generator 4200 and connected thereto via the network 4300. In this case, the rendered stream of images may be displayed on the display module at a later time after the simulation as occurred. The rendered stream of images may be displayed on the display module for viewing by a third party user, such as an instructor, or for the user 6200 of the system 6000.

Optionally, the method 5000 may further comprise receiving an eye-level or eye-orientation of the user 6200 from a motion tracker within the enclosed area 6100 and rendering the stream of images comprises rotating the stream of images in response to changes in the eye-level or eye-orientation of the user 6200. The eye-level or eye-orientation of the user 6200 may be received through the network 4300. If the user 6200 tilts his or her head, the enclosed area 6100 will appear to the user as though it has rotated. The rendered stream of images can be rotated to approximate how the enclosed area 6100 appears to the user 6200.

Optionally, the method 5000 wherein the system 6000 is an operating room simulator, the enclosed area 6100 is an operating room, and the user 6200 is a medical practitioner, such as a doctor or a nurse. There may be more than one user 6200 in the operating room 6100. The tangible instruments may comprise the standard medical instruments, devices, and tools commonly found in an operating room such as cutters, thermometers, stethoscopes, and monitors. The operating room 6100 may also provide one or more patients for surgery. The operating room may also provide one or more virtual simulated elements, such as other medical practitioners, a virtual window to another part of the hospital, or information from outside the operating room 6100, such as other emergencies or events. The sequence of events from the simulation engine 4500 and stored on the first database 4410 may comprise such events as a patient arriving, a medical emergency of the patient, an incision in the patient, a medical practitioner changing locations within the operating room 6100, and results from monitors and diagnostic tests. The operating room 6100 may contain motion sensors to track the movement of the users 6200. The video generator 4200 may receive changes in the location of the one or more users 6200 through the network 4300, such that the image generator module 4232 may include the images of the one or more users 6200 in the rendered stream of images.

Optionally, the method 5000 wherein the system 6000 is an aircraft. In the case where the system 6000 is not a simulator, the system 4000 will not comprise a simulation engine 4500. The sequence of events may therefore be produced by the aircraft 6000 itself. For example, a skilled person will understand that an aircraft typically records a sequence of events occurring throughout a flight on a black box flight recorder. This same sequence of events may be recorded on the first database 4410. Alternatively, the first database 4410 may be identical with the black box. Alternatively, the first database 4410 may be a separate module located on the aircraft 6000. As another alternative, the first database 4410 may be remove from the aircraft 6000 and receive the sequence of events over the network 4300 using wireless communication. The sequence of events that go to the black box may be further supplemented with further events relevant to the generation of the stream of images of the cockpit 6100 of the aircraft 6000, such as the movements and locations of the pilots 6200 within the cockpit 6100. The texture images or rendered images on the second database 4420 will be images of the cockpit 6100 of the aircraft 6000 excluding the view through the windows. The rendered stream of images may not comprise the view through the windows of the aircraft. Alternatively, one or more cameras may be place externally to the aircraft or within the cockpit 6100 to capture the view through the windows. The image generator module 4232 may render the stream of images by overlaying the view through the windows captured by the one or more cameras over the rendered stream of images of the interior of the cockpit 6100 of the aircraft 6000. Otherwise, rendering the stream of images in an actual aircraft is the same as rendering the stream of images in a simulated aircraft.

Optionally, the method 5000 wherein the system 6000 is a hospital operating room 6100. In the case where the system 6000 is an actual hospital operating room 6100, there will be no simulation engine 4500. There may be sensors throughout the hospital operating room 6100 for measuring and receiving a number of events that may occur in the hospital operating room throughout a surgery. For examples, the sensors may be integrated with the medical devices, instruments, and tools throughout the hospital operating room 6100. Furthermore, the sensors may include movement tracking sensors for tracking the movements and locations of patients, doctors, nurses, and other medical practitioners. As another option, events may be entered manually into a computer system. The sequence of events provided by sensors and manually may include such events as a patient arriving, a medical emergency of the patient, an incision in the patient, a medical practitioner changing locations within the operating room 6100, and results from monitors and diagnostic tests. The sequence of events are sent to the first database 4410 either directly via a cable 4450 or indirectly via the network 4300. Otherwise, the rendered stream of images for the hospital room 6100 is performed in the same way as for the simulated hospital room.

Optionally, the method 5000 further comprises capturing one or more visual-perception inhibitors affecting the user, wherein the one or more visual-perception inhibitors affect the user while performing the actions in the system. A visual-perception inhibitor is any human or other factor that may affect the user's vision while using the system 6000. A visual-perception inhibitor could be a stable human factor that does not substantially change while the user is using the system 6000. Such visual-perception inhibitors may include a defect in the user's 6200 eye that results in the user 6200 having a reduced peripheral vision compared to the average, or the fact that the user 6200 wears glasses or contacts resulting in a blurry peripheral vision. Further, the user 6200 may wear glasses with bifocal lenses. A visual-perception inhibitor may also comprise human factors that change dynamically throughout the use of the system 6000. For example, the user's 6200 pupils may dilate resulting in a change in the contrast for the user. As another example, the user 6200 may become fatigued or stressed resulting in other changes to the user's 6200 vision. As another example, the user 6200 may experience tunnel vision, where the user 6200 gazes at a particular display for too long.

In some cases, the visual-perception inhibitors could be inputted manually into the video generator 4200 by the user 6200 or a third party, such as an instructor prior to the user 6200 using the system 6000. Alternatively, one or more sensors (not shown) may be used to measure changes in the physiological characteristics of the user 6200. Examples of such sensors include electroencephalographs, electrocardiographs, thermometers, eye-tracking instruments, and eye-level or eye-orientation measurement instruments. Such sensors may then send their physiology data to the video generator 4200 via the input module (not shown) or via the network 4300. A third party user of the video generator 4200 may then interpret the physiology data and manually input the visual-perception inhibitors into the video generator 4200 via a keyboard and mouse (not shown) using a GUI of the display device. Alternatively, the video generator 4200 may automatically convert the physiology data from the sensors to visual-perception inhibitors. As a further alternative, the sensors or a device (not shown) associated with the sensors could automatically convert the physiology data to visual-perception inhibitors. In a preferred embodiment, the physiological data is converted automatically and in real-time to ensure that the video feed can be processed, modified, and displayed in real-time.

Various neuroscience, medical, psychological, human behavioral, and other scientific research enables the correlating of the physiological data with visual perception inhibitors. For example, the dilation of the pupils of the user 6200 may be correlated with a change in the contrast of the user's 6200 vision. As another example, an increase in the heartrate of the user 6200 may be correlated with increased stress which may be further correlated with a negative effect on the user's 6200 vision or reduced ability to hear aural signals or alarms. Similarly, certain patterns of blinking, pupillary response, and electrical signals in the brain may be correlated with certain effects on the user's 6200 vision. Likewise, an eye-tracking sensor may determine that the user 6200 is experiencing tunnel vision, in which case the user's 6200 peripheral vision may be restricted. One or more sensors may detect certain physiological characteristics of the user 6200 correlated with a blackout or partial blackout. Such scientifically established correlations may be used either by the third-party user interpreting the physiological data or by the video generator 4200 or other device in automatically converting the physiological data to visual-perception inhibitors.

The visual-perception inhibitors could further include non-human factors that could influence the user's vision. For example, a sensor could measure the g-forces being exerted on the user 6200, which would be an external cause that could affect the vision of the user 6200, for example by reducing the field of view of the user. A person skilled in the art will recognized that such g-forces could result in the user 6200 having a blackout or partial blackout, which could be detected by another sensor.

Optionally, the method 5000 wherein rendering the stream of images may comprise selectively modifying the stream of images considering the captured one or more visual-perception inhibitors. The image generator module 4232 modifies the stream of images to make it more closely resemble what the user 6200 sees. The modification of the stream of images is done in consideration of the video-perception inhibitors. For example, if the user 6200 has a restricted field of view, the image generator module 4232 may crop the images of the stream of images so that the angle of view of the stream of images is roughly the same as the field of view of the user 6200. If the user has a blurry peripheral vision, the image generator module 4232 may make the periphery of the images from the stream of images blurry. If the user's 6200 pupils dilate, the image generator module 4232 may modify the contrast of the images in the stream of images. If the user 6200 blacks out, the image generator module 4232 may fade out to black the images of the stream of images. If the user 6200 has tunnel vision, the image generator module 4232 may crop the images of the stream of images so that the angle of view of the stream of images is similar to that of the user's 6200. If the user 6200 experiences fatigue and/or stress, the image generator module 4232 may make the images or parts thereof of the stream of images blurry and in particular may make text appearing in those images blurry. The image generator module 4232 may make other non-focus elements in the images blurry. If the user 6200 wears bifocal glasses, the image generator module 4232 may modify the images of the stream of images to resemble bifocal glasses, such as by making the bottom part or the upper part of said images blurry. If the user 3200 experiences high g-forces, the image generator module 4232 may make the images of the video feed blurry or fade out to black. If the enclosed area 6100 shakes, the image generator module 4232 make shake the images of the video feed. If the user 6200 rotates his or her head, the image generator module 4232 might rotate the images of the video feed. A skilled person will understand that the correlations provided here between the physiological state of the user 6200 and the modifications of the images of the stream of images are offered merely as examples and that the same physiological states may result in a different modification to the images of the stream of images and that the same modifications to the stream of images may result from different physiological states.

The processor module 1230, 4230 may represent a single processor with one or more processor cores or an array of processors, each comprising one or more processor cores. The memory module 1220, 4220 may comprise various types of memory (different standardized or kinds of Random Access Memory (RAM) modules, memory cards, Read-Only Memory (ROM) modules, programmable ROM, etc.). The storage module 1400, 4410, 4420 may represent one or more logical or physical as well as local or remote hard disk drive (HDD) (or an array thereof). The storage module 1400, 4410, 4420 may further represent a local or remote database made accessible to the network 1300, 4300 by a standardized or proprietary interface. The network interface module 1210, 4210 represents at least one physical interface that can be used to communicate with other network nodes. The network interface module 1210, 4210 may be made visible to the other modules of the network 1300, 4300 through one or more logical interfaces. The actual stacks of protocols used by the physical network interface(s) and/or logical network interface(s) of the network interface module 1210, 4210 do not affect the teachings of the present invention. The variants of processor module 1230, 4230, memory module 1220, 4220, network interface module 1210, 4210 and storage module 1400, 4410, 4420 usable in the context of the present invention will be readily apparent to persons skilled in the art. Likewise, even though explicit mentions of the memory module 1220, 4220 and/or the processor module 1230, 4230 are not made throughout the description of the present examples, persons skilled in the art will readily recognize that such modules are used in conjunction with other modules of the network 1300, 4300 to perform routine as well as innovative steps related to the present invention.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A video processing apparatus for recreating a view of an enclosed area from the perspective of a user located within the area and having variably affected vision during a session, the video processing apparatus comprising:

a video input port for receiving a first video feed from one or more cameras located within the enclosed area during the session, the one or more cameras configured within the enclosed area to capture information within a field of view of the user, the first video feed being independent of the variably affected vision of the user;
 an input module comprising one or more sensors located within the enclosed area for:
  capturing physiology data from the user during the session; and
 one or more processors configured to:
  determine one or more visual-perception inhibitors affecting the vision of the user during the session based on changes in the physiology data that negatively affects the vision of the user and inhibits the user from interpreting the information within the field of view of the user as captured by the one or more cameras;
  detect a variation separating a first period of the session during which the vision of the user is unaffected and a second period of the session during which the vision of the user is negatively affected by the one or more visual-perception inhibitors;
  selectively modify images from the first video feed corresponding to the second period of the session as a function of the one or more visual-perception inhibitors to generate a second video feed, the second video feed being deteriorated according to the negatively affected vision of the user to represent what the user sees while the vision of the user is negatively affected; and
  provide the second video feed for display to another user.

2. The video processing apparatus of claim 1 further comprising a display module for displaying the second video feed and a storage for storing the second video feed.

3. The video processing apparatus of claim 1 wherein the one or more visual-perception inhibitors comprise at least one of:
 dizziness of the user;
 a partial blackout of the user;
 a higher than normal g-force on the user;
 fatigue;
 workload;
 stress;
 tunnel vision;
 a restricted field of view as a result of the user wearing glasses or contact lenses; or
 a restricted field of view or blurriness as a result of a prior eye defect or age.

4. The video processing apparatus of claim 1 wherein the one or more cameras have a video-feed angle of view and wherein the one or more processors are further configured for cropping the images considering an effective visual field of the user, the effective visual field being within the video-feed angle of view, wherein the effective visual field of the user is a possible field of view of the user or an actual field of view of the user.

5. The video processing apparatus of claim 4 further comprising a tangible or virtual toggle switch for switching the effective visual field of the user between the possible visual field of the user and the actual visual field of the user.

6. The video processing apparatus of claim 1, wherein generating the second video feed comprises at least one of:
 making the images or parts of the images blurry;
 making text within the images blurry;
 making the images shake; or
 increasing or decreasing the contrast of the images.

7. The video processing apparatus of claim 1, wherein the one or more sensors comprise a measurement device and wherein at least one of the one or more visual-perception inhibitors is automatically measured from the user using the measurement device.

8. The video processing apparatus of claim 7, wherein the measurement device measures an eye-level of the user and wherein generating the second video feed comprises rotating the video feed in response to changes in the eye-level of the user.

9. The video processing apparatus of claim 1, wherein the system is an interactive flight simulator and the enclosed area is a cockpit of the flight simulator.

10. The video processing apparatus of claim 1, wherein the system is an interactive hospital operating room simulator.

11. The video processing apparatus of claim 1, wherein the system is an interactive paramedic vehicle simulator or an interactive paramedic-related scene simulator.

12. The video processing apparatus of claim 1, wherein the one or more sensors are further for automatically capturing movements of the user and moving at least one of the one or more cameras in response to the captured movements.

13. The video processing apparatus of claim 1, wherein the another user that the second video feed is provided for display to is an instructor.

14. A method for recreating a view of an enclosed area from the perspective of a user located within the area and having variably affected vision during a session, the method comprising:
   receiving a first video feed, through a video input port, from one or more cameras located within the enclosed area, the one or more cameras configured within the enclosed area to capture information within a field of view of the user, the first video feed being independent of the variably affected vision of the user;
   capturing physiology data from the user during the session using one or more sensors located in the enclosed area;
   determining one or more visual-perception inhibitors affecting the vision of the user during the session based on changes in the physiology data that negatively affects the vision of the user and inhibits the user from interpreting the information within the field of view of the user as captured by the one or more cameras;
   detecting a variation separating a first period of the session during which the vision of the user is unaffected and a second period of the session during which the vision of the user is negatively affected by the one or more visual-perception inhibitors;
   selectively modifying images from the first video feed corresponding to the second period of the session as a function of the one or more visual-perception inhibitors to generate a second video feed, the second video feed being deteriorated according to the negatively affected vision of the user to represent what the user sees while the vision of the user is negatively affected; and
   providing the second video feed for display to another user.

15. The method of claim 14, further comprising displaying the second video feed on a display module.

16. The method of claim 14, wherein the one or more cameras have a video-feed angle of view and wherein generating the second video feed comprises cropping the images considering an effective visual field of the user, the effective visual field being within the video-feed angle of view, wherein the effective visual field of the user is a possible field of view of the user or an actual field of view of the user.

17. The method of claim 14, wherein at least one of the one or more visual-perception inhibitors is automatically measured from the user using a measurement device of the one or more sensors.

18. The method of claim 14, wherein the system is a flight simulator.

19. The method of claim 14, wherein at least one of the one or more cameras is located on a head of the user.

20. The method of claim 14, further comprising capturing movements of the user using the one or more sensors and moving at least one of the one or more cameras in response to the captured movements.

* * * * *